June 12, 1962  E. H. HARTEL  3,038,687
RETRACTABLE LANDING GEAR
Filed Sept. 3, 1959  5 Sheets-Sheet 1

INVENTOR.
ERWIN H. HARTEL
BY
ATTORNEY

June 12, 1962 E. H. HARTEL 3,038,687
RETRACTABLE LANDING GEAR
Filed Sept. 3, 1959 5 Sheets-Sheet 2

INVENTOR.
ERWIN H. HARTEL
BY
ATTORNEY

INVENTOR.
ERWIN H. HARTEL
BY
ATTORNEY

United States Patent Office
3,038,687
Patented June 12, 1962

3,038,687
RETRACTABLE LANDING GEAR
Erwin H. Hartel, Cleveland, Ohio, assignor to Cleveland Pneumatic Industries, Inc., Cleveland, Ohio, a corporation of Ohio
Filed Sept. 3, 1959, Ser. No. 837,909
9 Claims. (Cl. 244—102)

This invention relates to landing gears and more particularly to a new and improved landing gear retraction system.

In conventional landing gears, it is customary to retract the shock strut by rotating it around a horizontal axis. The retraction is normally accomplished by connecting a retraction actuator between the aircraft frame and the shock strut. The use of such conventional retraction mechanisms is normally satisfactory for use in aircraft wherein the landing gear is retracted into and stored in the wing structure of the aircraft. Such a system, however, does not lend itself to use in aircraft where the landing gear must be retracted and stored in or adjacent to the fuselage. A landing gear according to this invention is particularly suited for use in heavier type aircraft wherein the storage envelope is on the aircraft fuselage. In the illustrated embodiment, a landing gear according to this invention is shown in combination with a cargo type aircraft wherein an external blister is provided for the retracted landing gear. This configuration is particularly desirable in such cargo aircraft since the retracted landing gear does not protrude into the storage space for the cargo. It should be understood, however, that the landing gear could be arranged to retract into a storage well within the fuselage frame itself, thus eliminating the need of the landing gear storage blister.

It is an important object of this invention to provide an aircraft landing gear retractable into the aircraft fuselage with a wide wheel tread to insure ground stability of the aircraft.

It is another important object of this invention to provide a retractable landing gear which can be stored in the minimum space envelope within the aircraft fuselage.

It is another important object of this invention to provide a retractable landing gear which requires only three mounting points on the aircraft frame.

It is another important object of this invention to provide a retractable landing gear supported at points on the aircraft frame existing for other structural purposes.

It is still another object of this invention to provide a retractable landing gear wherein a single retraction actuator operates to perform multiple functions during the retraction operation.

It is still another object of this invention to provide a retractable landing gear wherein a shock strut is supported in a manner which minimizes the lateral strain in the shock strut cylinder.

Further objects and advantages will appear from the following description and drawings, wherein.

Figure 1:
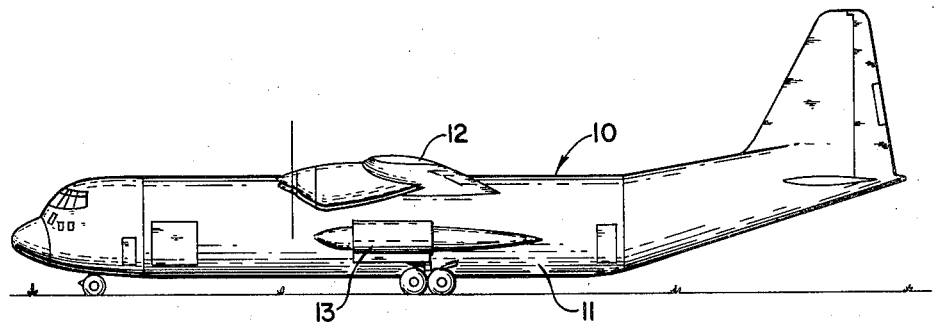
FIGURE 1 is a side elevation of an aircraft incorporating a landing gear according to this invention.

In FIGURE 1, an aircraft 10 is shown of the type to which a landing gear according to this invention is particularly suited. The illustrated aircraft 10 includes a fuselage 11 and high wings 12. The landing gear is mounted on the fuselage 11 and adapted to be retracted into a storage blister 13 when the aircraft is airborne.

Figure 2:
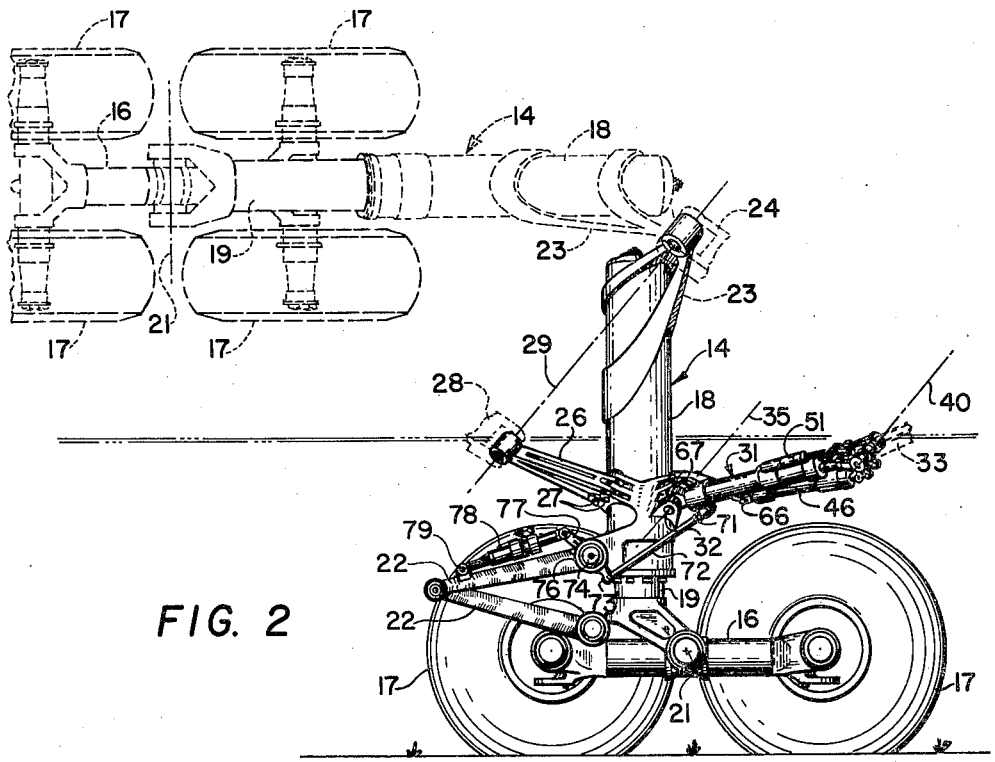
FIGURE 2 is a side elevation of the preferred landing gear shown in both the down and retracted positions.
Figure 3:
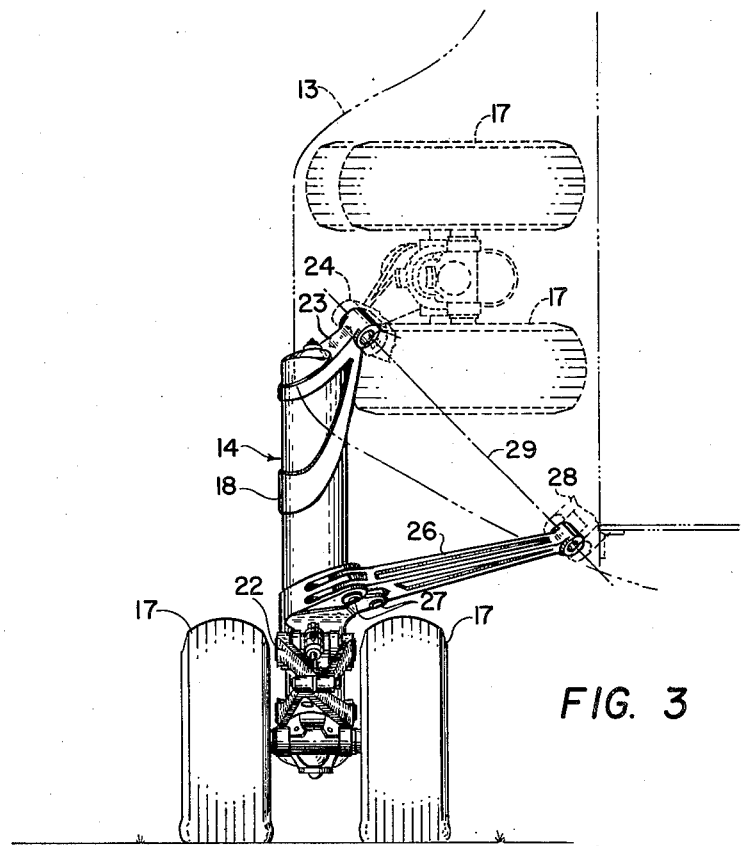
FIGURE 3 is a front view of the landing gear on both the down and retracted positions.
Figure 4:
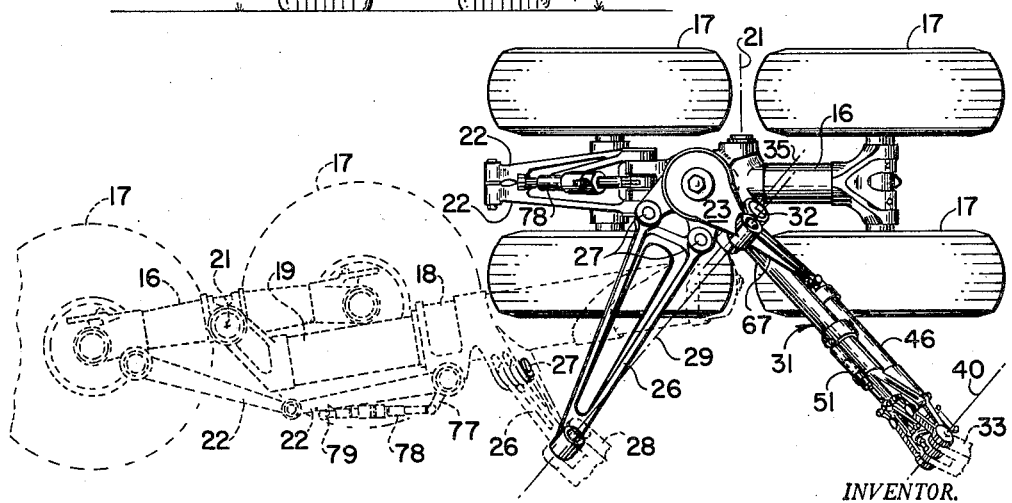
FIGURE 4 is a plan view of the landing gear in the down and retracted position.

Referring to FIGURES 2 through 4, the landing gear includes a shock strut 14 on the lower end of which is mounted an axle beam 16. Dual tandem landing wheels 17 are on opposite ends of the axle beam and function to support the aircraft when it is on the ground. The shock strut 14 includes a cylinder 18 and a piston 19 which cooperate to form the conventional air-oil shock absorbing unit. The piston 19 is urged axially downward relative to the cylinder 18 to resiliently support the weight of the aircraft when it is on the ground. Since the particular structure of the shock strut can be conventional, it has not been shown.

The axle beam 16 is pivoted on the lower end of the piston 19 for rotation around a pivot axis 21 between the folded position, best illustrated in the phantom view of FIGURE 4, and the down position, shown in FIGURE 2. The usual torque arms 22 are connected between the cylinder 18 and the axle beam 16 to prevent relative rotation around the longitudinal axis of the shock strut 14 while permitting telescoping movement of the piston 19 relative to the cylinder 18 as well as pivotal movement of the axle beam 16 about the pivot axis 21.

The cylinder 18 is formed with an upper mounting arm 23 which is pivoted on a support 24 projecting laterally from the aircraft frame. A lower mounting arm 26 is rigidly connected to the lower end of the cylinder 18 by pins 27 which project through lugs formed on the cylinder. The inner end of the lower mounting arm 26 is pivoted on a fitting 28 which is in turn mounted on the aircraft frame. The connection between the fitting 28 and the lower mounting arm 26 and between the support 24 and the upper mounting arm 23 is arranged so that the shock strut 14 can be rotated around a retraction axis 29. The retraction axis extends forward, downward, and inward relative to the longitudinal axis of the fuselage as illustrated by FIGURES 2 through 4. Therefore, when the shock strut 14 is rotated about the retraction axis 29 from the down position to the phantom retracted position illustrated in these figures, the shock strut moves to a horizontal position in which the landing wheels 17 are in a horizontal plane. During the retraction of the landing gear, the axle beam 16 is rotated around the pivot axis 21 to a folded position along the shock strut 14. The manner in which this is accomplished will be discussed in detail below.

A telescoping drag brace 31 is pivoted at 32 on lugs formed on the strut cylinder 18 and at its other end on a mounting fitting 33 secured to the aircraft frame. The drag brace includes three telescoping members 34, 36, and 37. The pivot 32 connecting the drag brace 31 and the strut cylinder 18 is on the outer telescoping member 34 and permits relative rotation about an axis 35 parallel to the retraction axis 29. The inner telescoping member 37 is formed with a mounting lug 38 which is connected to the fitting 33 by a pivot pin 39 for relative rotation about a pivot axis 40 parallel to the retraction axis 29. Bearings 41 provide a sliding connection between the three telescoping members 34, 36, and 37 so that movement of the shock strut 14 around the retraction axis 29 results in extending or compressing movement between the telescoping members. The use of three telescoping members insures that there will be a substantial overlap even when the drag brace is extended to provide sufficient spacing between the bearings 41 for stability. As best illustrated in FIGURE 2, the drag brace 31 is telescoped to its shortest length when the landing gear is in its down position and is extended when the landing gear is in the retracted position.

Figure 5:
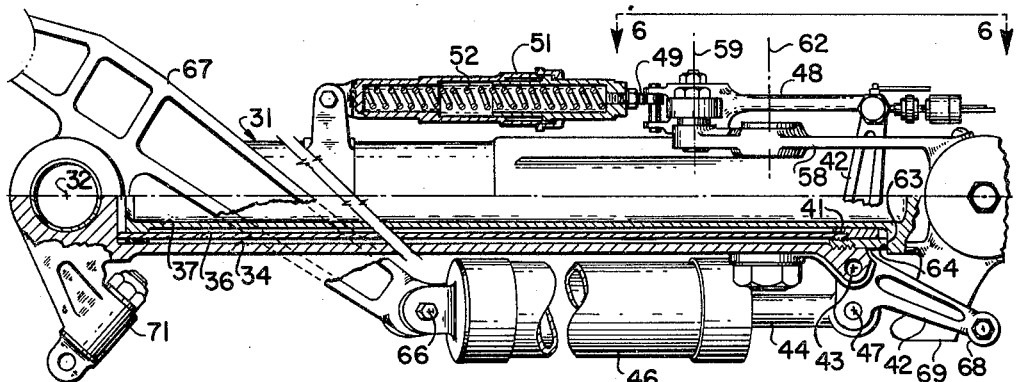
FIGURE 5 is a side elevation partially in longitudinal section of the drag brace and retraction actuator structure.
Figure 6:
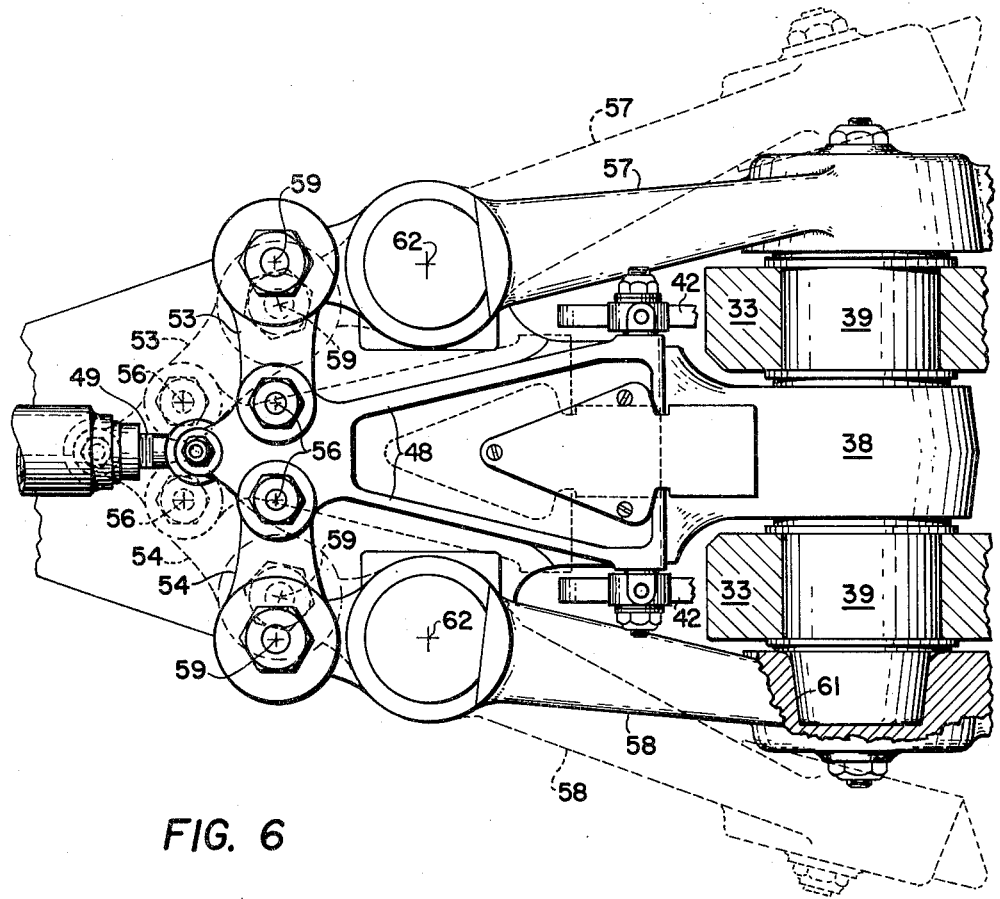
FIGURE 6 is an enlarged view taken along 6—6 of FIGURE 5 illustrating the downlock structure.

In order to lock the landing gear in the locked position, a downlock mechanism, shown in FIGURES 5 and 6, is utilized. The downlock mechanism includes a pair of similar bell crank levers 42 pivoted for rotation about an axis 43 on either side of the outer telescoping member 34 of the drag brace 31 on the end adjacent to the aircraft frame. A piston 44 of a retraction actuator 46 is connected to the bell crank levers 42 at 47 and operates to rotate the levers in a counterclockwise direction from the locked position to the unlocked position at the initiation of the retraction cycle. The upper ends of the bell crank levers 42 are connected to one end of a drive link 48. The other end of the drive link is connected to a plunger 49 of a bungee spring 51. The bungee spring 51 is pivoted on the outer telescoping member 34 and is provided with a mechanical spring 52 which urges the plunger 49 to the right, as viewed in FIGURES 5 and 6. The drive link 48 is connected to a pair of similar operating links 53 and 54 by pivots 56. The outer ends of the operating links 53 and 54 are connected to locking arms 57 and 58 respectively by pivots 59. The ends of each of the locking arms 57 and 58 are formed with a socket 61 which fits over opposite ends of the pivot pin 39 when the downlock mechanism is in the locked position. Each of the locking arms 57 and 58 is pivotally connected to the outer telescoping member 34 by a pivot 62. Therefore, when the locking arms 57 and 58 are in the locked position, shown in the solid line view of FIGURE 6, they prevent relative movement between the outer telescoping member 34 and the pivot pin 39 thus preventing extending movement of the drag brace 31.

In the operation of the downlock, movement of the bell crank levers 42 in a counterclockwise direction, as viewed in FIGURE 5, causes the drive link 48 to move to the left against the action of the bungee spring 51 to the unlocked or phantom position of FIGURE 6. This movement, through the connection of the operating links 53 and 54, rotates the locking arms 57 and 58 until the sockets 61 are clear of the pivot pin 39 so the mechanism is in the unlocked position. When the socketed ends of the locking arms 57 and 58 fit over the pivot pin 39, the pivots connecting the two operating links 53 and 54 to the locking arms and the drive link 48 are aligned so the linkage is in a dead center position. Therefore, any force tending to rotate the locking arms 57 and 58 toward the unlocked position cannot overcome the action of the bungee spring 51 to unlock the system. Compressive forces applied to the drag brace 31 are transmitted directly through the outer telescoping member 34 to the fitting 39 since the open end 63 of the outer telescoping member 34 engages a shoulder 64 on the fitting end of the inner telescoping member 37.

The cylinder of the retraction actuator 46 is connected by a pin 66 to a fixed arm 67 mounted on the lower end of the strut cylinder 18. The retraction actuator 46 is of the normal hydraulic piston and cylinder type which can be pressurized to either extend or retract the piston 44 relative to the cylinder of the actuator 46. When the landing gear is to be retracted, the retraction actuator 46 is pressurized to extend its piston 44. The initial extension of the actuator operates to release the downlock mechanism by rotating the bell crank levers 42 in a counterclockwise direction until the bungee spring 51 bottoms out. At this time, the locking arms have been rotated clear of the pivot pin 39 and the downlock is in the unlocked position. Since the bungee spring 51 bottoms out in this position, the pivot 47 is effectively fixed relative to the outer telescoping member 34 and further extension of the retraction actuator produces retraction of the landing gear.

Figure 7:
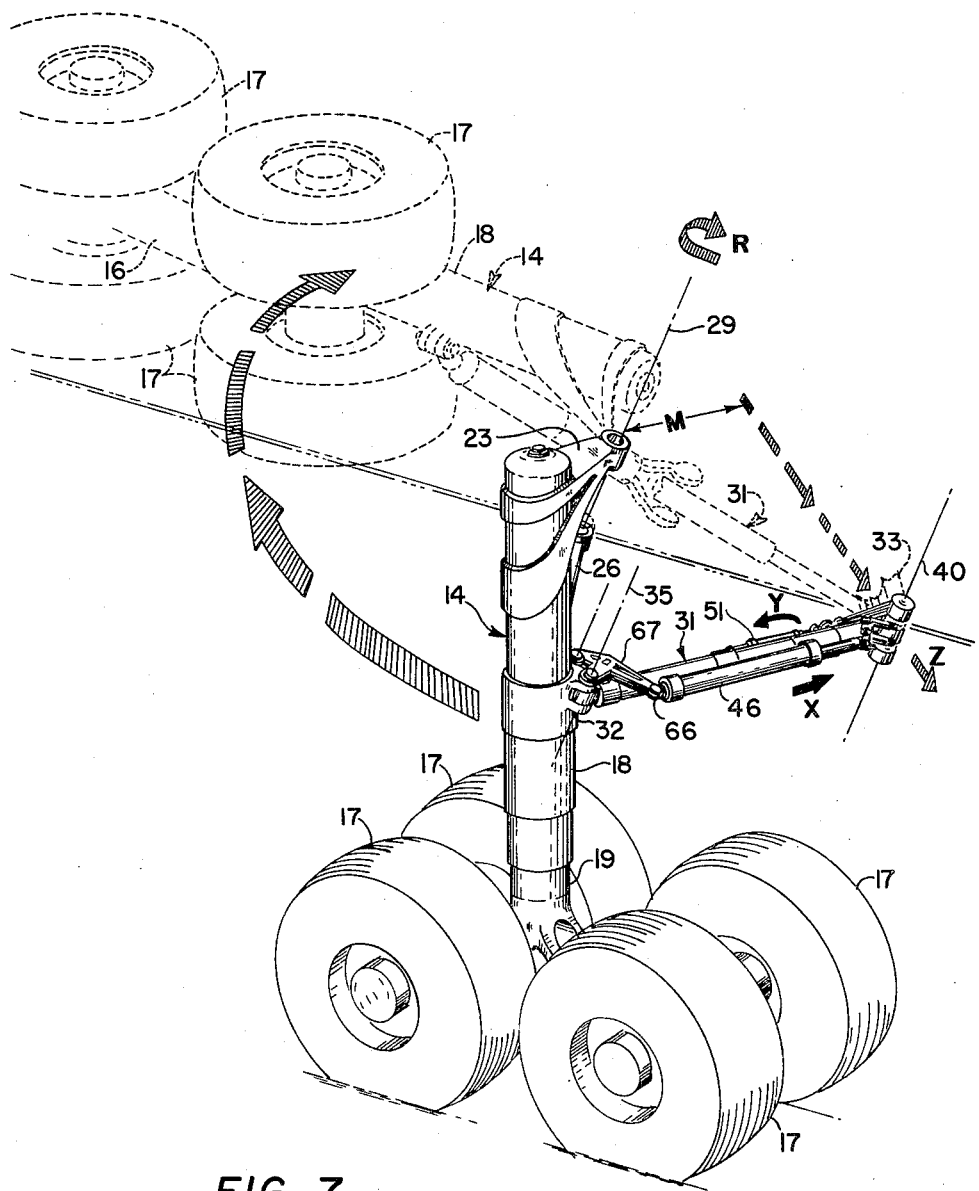
FIGURE 7 is a perspective view of the landing gear in the down and in the retracted position illustrating the retraction force moments.

In FIGURE 7, the retraction forces are illustrated. When the actuator piston 44 extends, it produces a force X on the bell crank levers 42. Because the force X is spaced to one side of the longitudinal axis of the drag brace 31, it results in a force moment Y which rotates the drag brace 31 around its pivot 32 on the strut cylinder 18. The force moment Y is transmitted through the telescoping drag brace members 34, 36, and 37 and results in a reaction force Z between the drag brace 31 and the mounting fitting 33 on the aircraft frame. The line of action of the reaction force Z is spaced from the retraction axis 29 by a moment arm M and results in a force moment R on the strut cylinder 18 which rotates the strut cylinder to the retracted position.

During the retraction movement of the landing gear, the drag brace 31 extends to the phantom or retracted positions illustrated. To extend the landing gear, the retraction actuator is pressurized in the opposite direction to move its piston 44 into the cylinder of the retraction actuator 46. As the landing gear approaches the down position, a cam follower 68, illustrated in FIGURE 5, engages a cam 69 in the inner telescoping member 37 and operates to insure that the downlock is moved to its unlocked position. Once the elements reach the landing gear down position, the cam follower 68 passes beyond the cam 69 and causes the lock to move to the locked position under the influence of the bungee spring 51.

The use of a telescoping drag link and the mounting of the actuator as described permits the use of an actuator having a relatively short stroke even though the drag link must extend a long distance. Mounting of the retraction actuator between the strut cylinder and the drag brace also eliminates the necessity of a fourth mounting point for the landing gear. The landing gear is therefore mounted at only three points on the aircraft frame.

Figure 8:
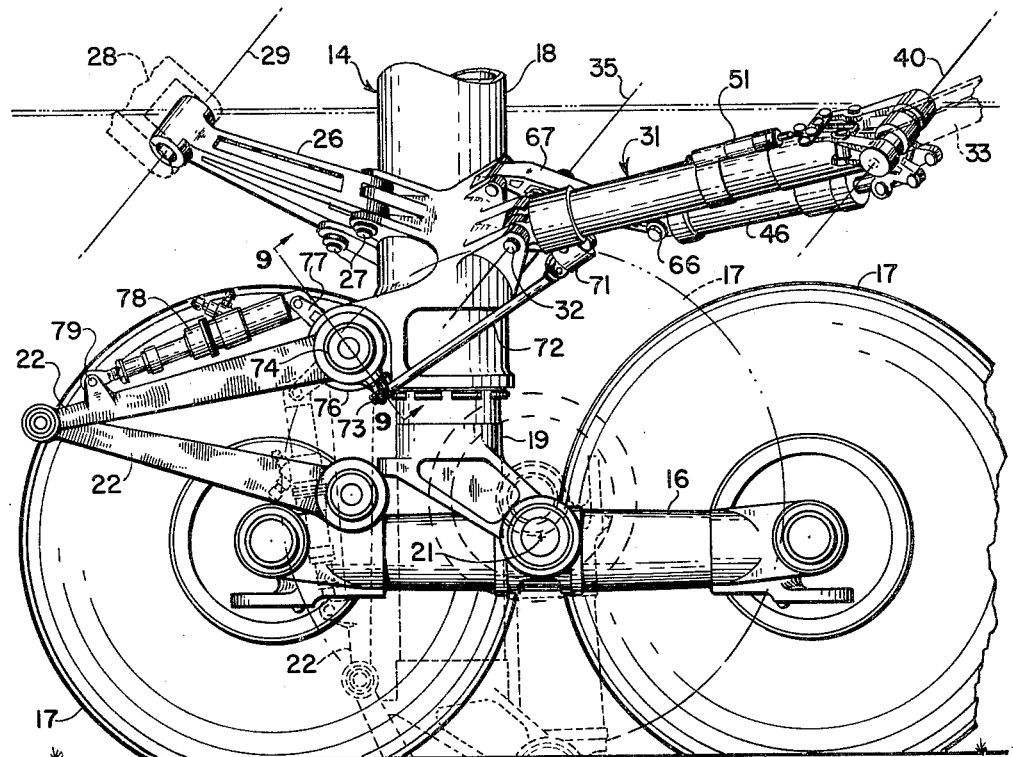
FIGURE 8 is an enlarged fragmentary view of the axle beam structure showing the axle beam in the normal landing position and in the folded position.
Figure 9:
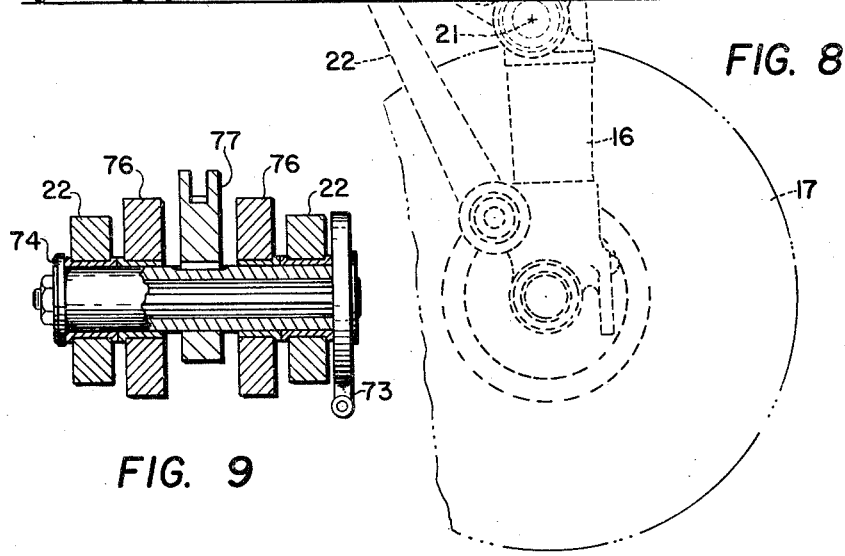
FIGURE 9 is a fragmentary cross section taken along 9—9 of FIGURE 8.

During the retraction of the landing gear, the outer telescoping member 34 of the drag brace 31 rotates relative to the strut cylinder 18 around the pivot 32. This movement is transmitted through a linkage and operates to rotate the axle beam 16 about its pivot axis 21 to the folded position wherein it extends along the strut cylinder. As best illustrated in FIGURE 8, the outer telescoping member 34 is formed with a boss 71 on which is mounted one end of a push rod 72. The other end of the push rod 72 is connected to a crank arm 73 formed on a mounting pin 74. The mounting pin 74 is journalled on lugs 76 of the strut cylinder 18 and in turn provides the upper pivot for the torque arms 22. The mounting pin 74 is formed with a second crank arm 77 which is connected to one end of an axle beam positioning bungee spring 78. The other end of the bungee spring 78 is connected at 79 to the upper torque arm 22. The bungee spring 78 is preferably a pneumatic spring which can be compressed or extended of the type disclosed in my copending application Serial No. 603,431 filed August 10, 1956, now Patent No. 2,968,478. Reference should be made to that application for a more detailed description of the structure of this spring. When the landing gear is in the down and locked position, the drag brace 31 is in a fixed position relative to the strut cylinder 18. Therefore, the crank arm 77, through its connection with the push rod 72 is in a fixed position relative to the strut cylinder 18. The bungee spring is proportioned to urge the upper torque arm 22 to a predetermined position relative to the strut cylinder 18. However, the bungee spring can permit rotation of the upper torque arm 22 in either direction from this normal position. The various elements are proportioned so that the lower torque arm 22 maintains the axle beam in a predetermined angular position relative to the shock strut 14 when the aircraft is airborne and the shock strut is in the extended position. This position is arranged so that the rearward landing wheels 17 will engage the ground first to prevent simultaneous spinup of all four wheels to eliminate the unnecessary strains on the landing gear which such a spinup would create. As the landing gear moves to the retracted position, the drag brace 31 rotates around its pivot 32. This motion is transmitted through the push rod 72 and the crank arm 73 and causes the crank arm 77 to rotate relative to the shock strut 14. The proportions are arranged so that the bungee spring 78 rotates the two torque arms 22 to a position which causes the axle beam 16 to be folded along the shock strut 14 when the landing gear reaches the retracted position, as shown by the phantom position of FIGURE 8.

The retraction actuator therefore supplies a multiple function of first releasing the downlock and thereafter retracting the landing gear as well as folding the axle beam 16 along the shock strut 14. On movement of the landing gear to the down and locked position, the elements return to the inital position and the axle beam is repositioned for landing. Because the retraction axis is inclined both forward and inboard relative to the fuselage, the retraction of the landing gear rotates the wheels to a horizontal plane and permits an efficient retraction storage.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A landing gear for an aircraft having a frame comprising a landing wheel supported strut journalled on said frame for rotation about a retraction axis extending downward and inward relative to the longitudinal axis of the frame, a drag brace including telescoping members, a first pivot connecting said strut and one of said members for relative rotation about a first axis spaced from and parallel to said retraction axis, a second pivot connecting said frame and another of said members for relative rotation about a second axis spaced from and parallel to said retraction axis, and a retraction actuator connected between said strut and said one member operable to produce relative rotation therebetween about said first axis and rotation of said strut about said retraction axis.

2. A landing gear for an aircraft having a frame comprising a shock absorbing strut journalled on said frame for rotation about a retraction axis extending downward and inward relative to the longitudinal axis of the frame, an axle beam mounted on the lower end of said strut for pivotal movement between a normal position substantially perpendicular to said strut and a folded position along said strut, landing wheels on said axle beam, a drag brace including telescoping members, a first pivot connecting said strut and one of said members for relative rotation about a first axis spaced from and parallel to said retraction axis, a second pivot connecting said frame and another of said members for relative rotation about a second axis spaced from and parallel to said retraction axis, a retraction actuator connected between said strut and said one member operable to produce relative rotation therebetween about said first axis and rotation of said strut about said retraction axis, and an operating linkage connected between said one member and axle beam moving said axle beam between said normal and folded positions in response to rotation between said one member and strut.

3. A landing gear for an aircraft having a frame comprising a shock absorbing strut journalled on said frame for rotation about a retraction axis inclined inward and downward relative to said frame between a down and a retracted position, an axle beam mounted on the lower end of said strut for pivotal movement between a normal position substantially perpendicular to said strut and a folded position along said strut, landing wheels having a plane of rotation on said axle beam, a drag brace including telescoping members, a first pivot connecting said strut and one of said members for relative rotation about a first axis spaced from and parallel to said retraction axis, a second pivot connecting said frame and another of said members for relative rotation about a second axis spaced from and parallel to said retraction axis, a retraction actuator connected between said strut and said one member operable to produce relative rotation therebetween about said first axis and rotation of said strut about said retraction axis, and an operating linkage connected between said one member and axle beam moving said axle beam between said normal and folded positions in response to rotation between said one member and strut, said plane of rotation of said wheels being vertical when said strut is in said down position and horizontal when said strut is in said retracted position.

4. A landing gear for an aircraft having a frame comprising a landing wheel supporting strut journalled on said frame for rotation about a retraction axis extending downward and inward relative to the longitudinal axis of the frame, a drag brace including telescoping members, a first pivot connecting said strut and one of said members for relative pivotal movement, a second pivot connecting said frame and another of said members for relative pivotal movement, a retraction actuator connected between said strut and said one member operable to produce relative pivotal movement therebetween and rotation of said strut about said retraction axis, and a lock mechanism connected to said one member and actuator normally preventing movement between said one member and said frame adjacent to said second pivot and releasable under the influence of said actuator to permit relative movement between said one member and frame.

5. A landing gear for an aircraft having a frame comprising a shock absorbing strut journalled on said frame for rotation about a retraction axis, an axle beam mounted on the lower end of said strut for pivotal movement between a normal position substantially perpendicular to said strut and a folded position along said strut, landing wheels on said axle beam, a drag brace including telescoping members, a first pivot connecting said strut and one of said members for relative rotation about a first axis spaced from and parallel to said retraction axis, a second pivot connecting said frame and another of said members for relative rotation about a second axis spaced from and parallel to said retraction axis, a retraction actuator connected between said strut and said one member operable to produce relative rotation there-between about said first axis and rotation of said strut about said retraction axis, a lock mechanism connected to said one member and actuator normally preventing movement between said one member and said frame adjacent to said second axis and releasable under the influence of said actuator to permit relative movement between said one member and frame, and an operating linkage connected between said one member and axle beam moving said axle beam between said normal and folded positions in response to rotation between said one member and strut.

6. A landing gear for an aircraft having an elongated frame with a longitudinal axis comprising a landing wheel, a shock absorbing strut mounted on the landing wheel and journalled on said frame for rotation about a retraction axis inclined downward and inward relative to said longitudinal axis, a collapsing drag brace, a first pivot connecting one end of said drag brace to said strut for pivotal movement relative thereto around a first pivot axis spaced from and parallel to said retraction axis, a second pivot connecting the other end of said brace to said frame for pivotal movement relative thereto about a second pivot axis spaced from and parallel to said retraction axis, and a retraction actuator connected between said strut and brace operating to produce relative pivotal movement between said brace and strut about said first pivot axis thereby producing pivotal movement of said strut around said retraction axis to a retracted position in which the landing wheel lies in a horizontal plane.

7. A landing gear for an aircraft having a fuselage comprising a vertically extending shock absorbing strut, landing wheels on the lower end of said strut, an upper mounting arm fixedly secured to the upper end of said strut extending inwardly towards said fuselage, a lower mounting arm fixedly secured to said strut extending inwardly toward said fuselage, means pivotally connecting the inner ends of said mounting arms on said fuselage for rotation about a retraction axis inclined inward, downward, and forward relative to said fuselage, a drag brace including at least two telescoping members, a pivot connecting said strut and one of said members for relative pivotal movement, a pivot connecting said frame and the other of said members for relative pivotal movement, and a retraction actuator connected between said strut and said one member operable to produce relative pivotal movement therebetween and rotation of said strut about said retraction axis to a retracted position in which the landing wheels lie in a horizontal plane.

8. A landing gear for an aircraft having a fuselage comprising a vertically extending shock absorbing strut, an axle beam mounted on the lower end of said strut for pivotal movement between a normal position substantially perpendicular to said strut and a folded position along said strut, landing wheels on said axle beam, an upper mounting arm on the upper end of said strut extending inwardly toward said fuselage, a lower mounting arm on said strut extending inwardly toward said fuselage, means pivotally connecting the inner ends of said mounting arms on said fuselage for rotation about a retraction axis inclined inward, downward, and forward relative to said fuselage, a drag brace including at least two telescoping members, a pivot connecting said strut and one of said members for relative pivotal movement, a pivot connecting said frame and the other of said members for relative pivotal movement, a retraction actuator connected between said strut and said one member operable to produce relative pivotal movement therebetween and rotation of said strut about said retraction axis, and an operating linkage connected between said one member and axle beam moving said axle beam between said normal and folded positions in response to pivotal movement between said one member and strut.

9. A landing gear for an aircraft having a fuselage comprising a vertically extending shock absorbing strut, an axle beam mounted on the lower end of said strut for pivotal movement between a normal position substantially perpendicular to said strut and a folded position along said strut, landing wheels having a plane of rotation on said axle beam, an upper mounting arm on the upper end of said strut extending inwardly toward said fuselage, a lower mounting arm on said strut extending inwardly toward said fuselage, means pivotally connecting the inner ends of said mounting arms on said fuselage for rotation about a retraction axis inclined inward, downward, and forward relative to said fuselage, a drag brace including at least two telescoping members, a pivot connecting said strut and one of said members for relative pivotal movement, a pivot connecting said frame and the other of said members for relative pivotal movement, a retraction actuator connected between said strut and said one member operable to produce relative pivotal movement therebetween and rotation of said strut about said retraction axis, and an operating linkage connected between said one member and axle beam moving said axle beam between said normal and folded positions in response to pivotal movement between said one member and strut, said plane of rotation of said wheels being vertical when said strut is in said down position and horizontal when said strut is in said retracted position.

References Cited in the file of this patent

UNITED STATES PATENTS

| | | |
|---|---|---|
| 2,772,060 | Bendicsen | Nov. 27, 1956 |
| 2,869,806 | Beach | Jan. 20, 1959 |
| 2,896,884 | Perdue | July 28, 1959 |

FOREIGN PATENTS

| | | |
|---|---|---|
| 492,096 | Italy | Mar. 15, 1954 |